J. G. MEREDITH.
SIDE DUMPING HAND CAR.
APPLICATION FILED DEC. 23, 1916.
1,230,005.
Patented June 12, 1917
3 SHEETS—SHEET 1.
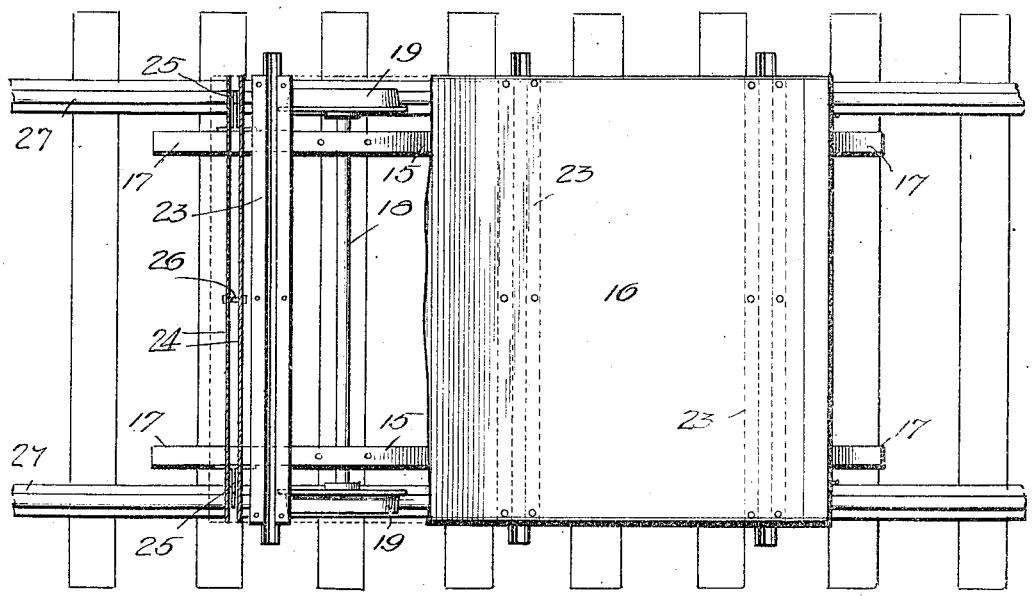
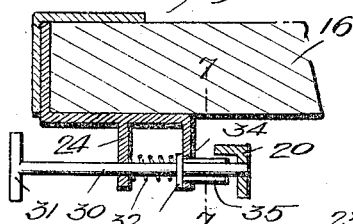
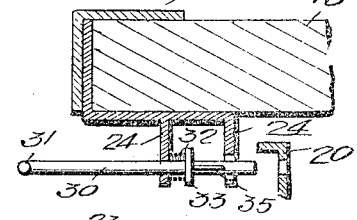
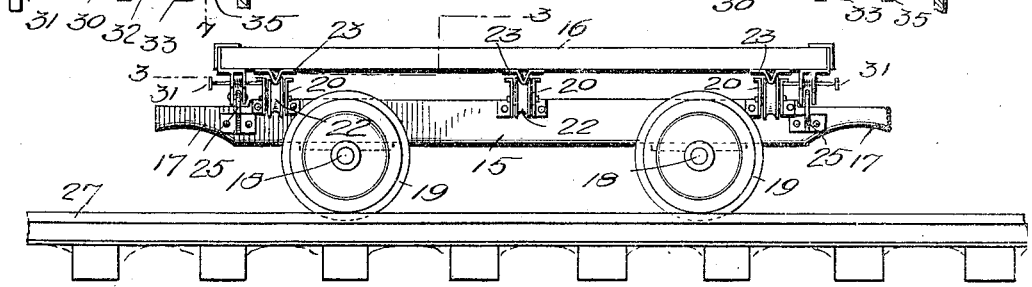
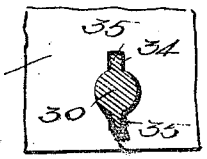
WITNESSES
INVENTOR
James G. Meredith
BY
ATTORNEYS J. G. MEREDITH.
SIDE DUMPING HAND CAR.
APPLICATION FILED DEC. 23, 1916.
1,230,005.
Patented June 12, 1917.
3 SHEETS—SHEET 2.
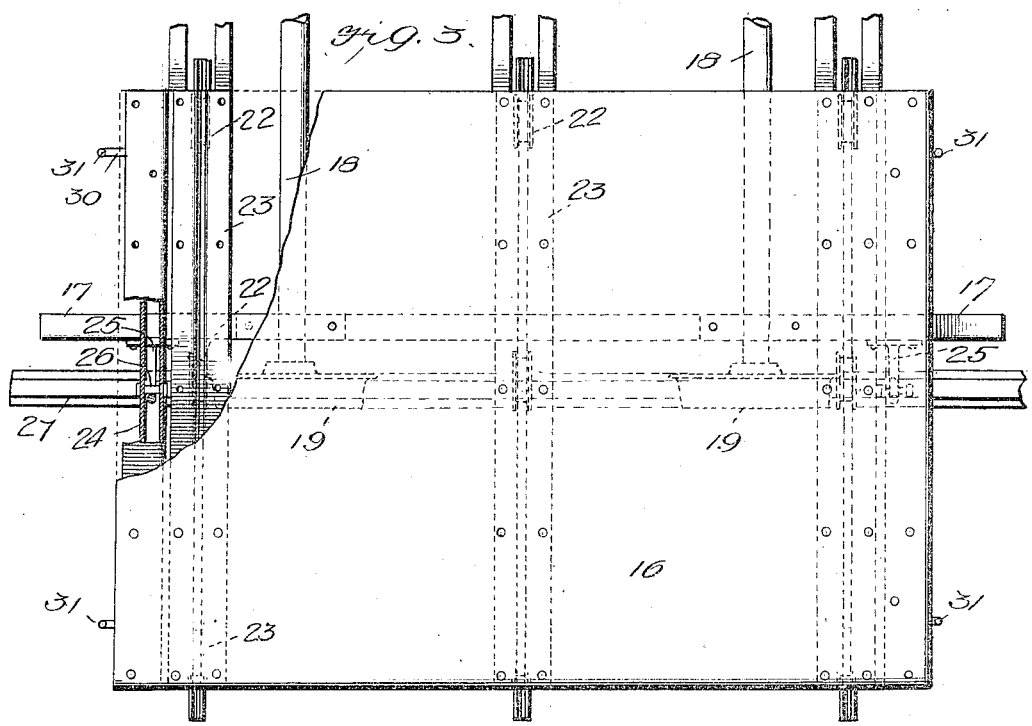
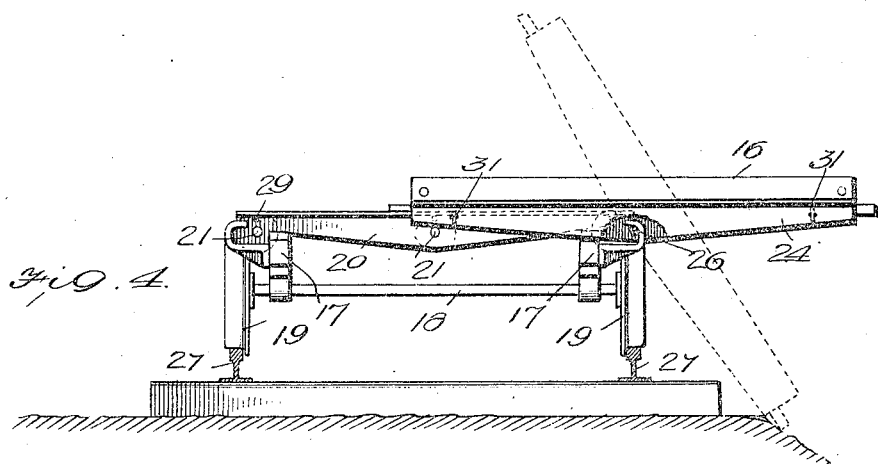
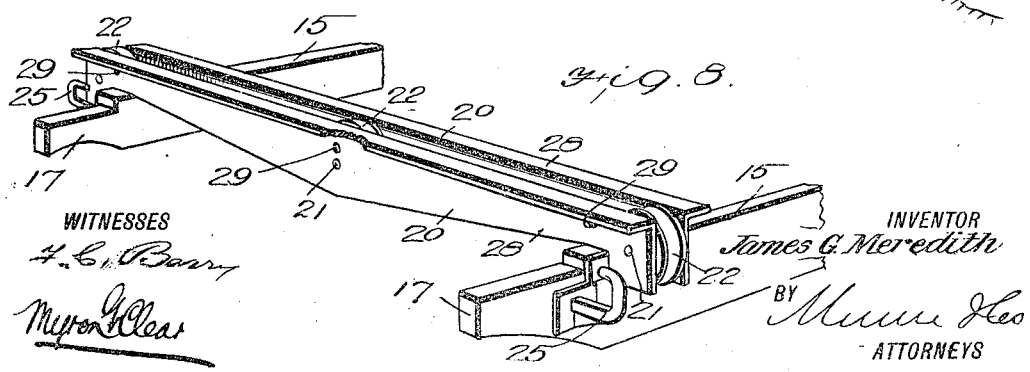
WITNESSES
INVENTOR
James G. Meredith
BY
ATTORNEYS J. G. MEREDITH.
SIDE DUMPING HAND CAR.
APPLICATION FILED DEC. 23, 1916.
1,230,005.
Patented June 12, 1917.
3 SHEETS—SHEET 3.
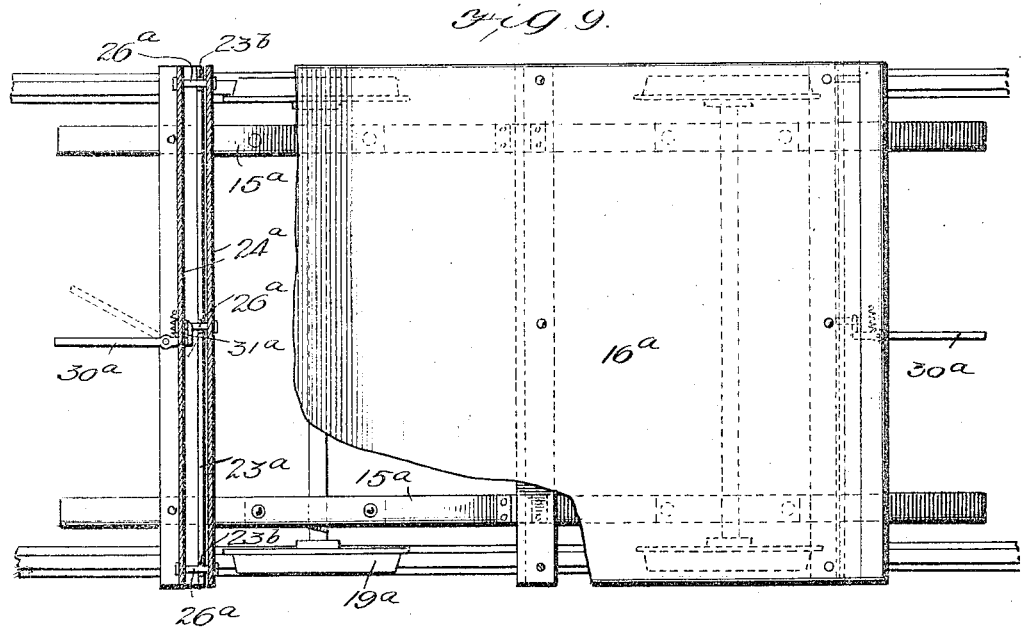
Fig. 9.
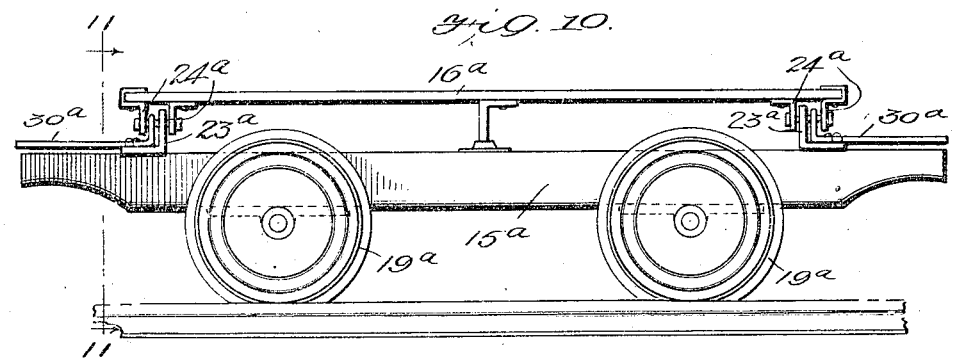
Fig. 10.
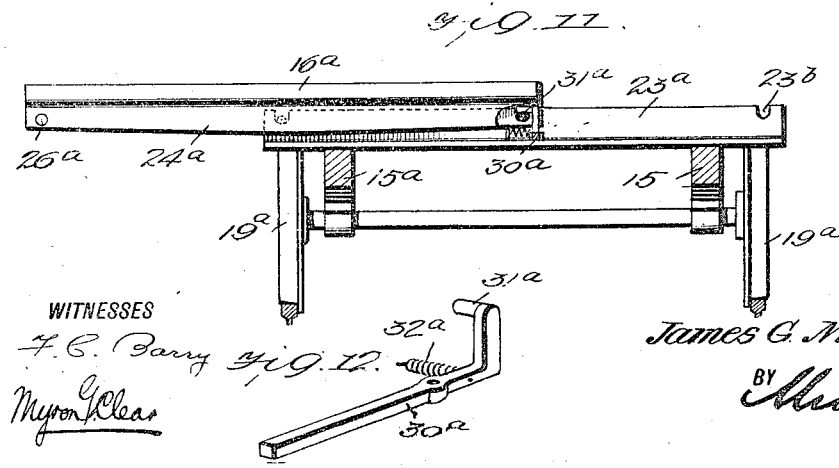
Fig. 11.
Fig. 12.
WITNESSES
F. C. Barry
Myron G. Clear
INVENTOR
James G. Meredith
BY
ATTORNEYS

UNITED STATES PATENT OFFICE.

JAMES GUSTAVUS MEREDITH, OF LYNCHBURG, VIRGINIA.

SIDE-DUMPING HAND-CAR.

1,230,005.  Specification of Letters Patent.  Patented June 12, 1917.

Application filed December 23, 1916. Serial No. 138,535.

*To all whom it may concern:*

Be it known that I, JAMES G. MEREDITH, a citizen of the United States, and a resident of Lynchburg, in the county of Campbell and State of Virginia, have invented a certain new and useful Improvement in Side-Dumping Hand-Cars, of which the following is a specification.

My present invention relates generally to railway rolling stock, and more particularly to hand cars, my object being to provide a dumping hand car in connection with which material may be loaded on, and dumped from, at points laterally beyond the track bed.

A further object of my invention is to provide a dumping car of this nature, by means of which the loading and dumping operations may be greatly facilitated, which will be a time saver in use, and which will obviate the necessity for the usual dumping boxes located upon flat cars, at present for the same purpose.

These and other objects, residing for the most part in the details of construction, arrangement, and operation of the several parts, will appear in the course of the following description, reference being made to the accompanying drawings, forming a part of this specification, and wherein—

Figure 1 is a top plan view of my improved dumping hand car, a portion of the platform at one end being broken away;

Fig. 2 is a side elevation;

Fig. 3 is a partial plan view, partly broken away and in section, illustrating the platform shifted laterally to one side in dumping position;

Fig. 4 is an end elevation of the complete car, with the platform in the position shown in Fig. 3;

Fig. 5 is a detail vertical section through a portion of one end of the platform and adjacent parts, illustrating one of the platform locks in operative position;

Fig. 6 is a similar view of the lock in inoperative position;

Fig. 7 is a detail vertical section taken substantially on line 7—7 of Fig. 5,

Fig. 8 is a detail perspective view of a part of the wheeled frame.

Fig. 9 is a plan view partly broken away and in section, illustrating a slightly modified form;

Fig. 10 is a side elevation of the form shown in Fig. 9;

Fig. 11 is a vertical transverse section taken substantially on line 11—11 of Fig. 10, and Fig. 12 is a detail perspective view of the locking lever of the form of the invention shown in Figs. 9 to 11.

Referring now to Figs. 1 to 8, my invention contemplates the provision of certain features in connection with a hand car, having longitudinal side bolsters 15, the extreme ends of which, beyond the car platform 16, are reduced to form handles 17, materially beyond the axles 18, on which the bolsters 15 are supported, and at the ends of which are the wheels 19.

Transversely across and above the bolsters 15 are secured longitudinally spaced pairs of cross beams 20, through which at the ends and at intermediate points, are secured the shafts 21 of rollers 22, the latter being disposed between the spaced parallel beams 20, and provided with grooved surfaces, as particularly seen in Figs. 3 and 8, to receive in laterally shifting relation, the lower transverse ribs 23 of the car platform 16, the latter of which may be moved laterally toward either side of the frame of the car, and moved easily and readily even with a heavy load, by means of the construction just described.

In addition to its lower rib 23 resting upon the rollers 22, the platform 16 is provided adjacent its ends with pairs of spaced parallel beams 24 which depend transversely above the bolsters 15, and upon relatively opposite sides of laterally and outwardly projecting hooks 25 secured to the bolsters 15, with their free extremities upturned, the beams 24 of the platform 16 having a central transverse cross bar 26, movable into engagement with the hooks 25 when the platform is shifted laterally, in order that, as seen in Fig. 4, the hooks and cross bars when so engaged, may form a fulcrum for the platform 16, upon which the latter may be tilted to dumping position, as shown in dotted lines in the said figure, the fulcrum so formed by movement of the platform to either side of the main wheeled frame, being located in the vertical plane of the wheels 19, and hence in the vertical plane of one of the track rails 27 upon which the main wheeled frame travels, so that the load will thus be balanced and its weight supported at one side of the main frame in the plane of the track at that side, so as to obviate tilting the main frame as well.

Beneath their upper horizontal flanges 28, the end cross beams 20 of the wheeled frame are provided with central and end openings, 29, into which the inner ends of locking bolts 30 mounted through the end portions of the cross beams 24 of the platform 16 are engageable, these bolts 30, one of which is shown in Figs. 5, 6, and 7, having outer handles 31 and normally held in inner operative position by means of springs 32 surrounding the same and bearing against one of the cross beams 24, and collars 33 secured to the bolts. The opening of one of the cross beams 24 at each end of the platform, through which the bolts 30 extend, are also provided with diametrically opposed recesses 34, and the inner portions of the bolts 30 are provided with side wings 35 so that by withdrawing the bolts 30 against the tension of the springs 32 and until the wings 35 are positioned outwardly beyond the recesses 34, a partial rotation of the bolts, serving to disaline the wings 35 and recesses 34, will prevent movement of the bolts inwardly to operative position and will in fact secure the same in inoperative position as shown in Fig. 6.

It is thus obvious that the platform 16 may be locked in its normal position shown in Fig. 1, by means of the several locking bolts 30, of which those at one end of the platform may be secured in inoperative position, if so desired, in order that the platform in its laterally shifting movement, may be controlled from one end of the car only.

It is also obvious that, when the platform is shifted laterally to extend beyond one side of the rolling frame, as shown in Fig. 3, as for instance, in the loading of the platform from a point laterally beyond the roadbed, the platform may still be locked by means of the bolts 30 at one side thereof, in engagement with the central openings 29 of the end cross beams 20 of the rolling frame, and that, when in such position, the car obviously saves lengthy throw of material, from, for instance, the ditches at opposite sides of the roadbed, and obviates the necessity of throwing the material high into the dumping boxes usually utilized upon flat hand cars for the same purposes to which the present invention is designed.

When loaded, it is obvious that my improved hand car may be drawn or pushed upon the tracks 27 to a point where the material is to be dumped, either with or without shifting the platform 16 to its normal position, and that when the point at which the material is to be dumped is reached, the normally locked bolts may be released and the platform readily tilted to the dotted line position shown in Fig. 4, in view of the engagement of the cross bars 26 within the hooks 25 at the respective sides of the car frame.

My invention will, for the foregoing reasons, save considerable time in the loading and dumping of material, in connection with roadbed maintenance and repair, will materially reduce the necessary labor, and will obviate the necessity of the unwieldy dumping boxes usually utilized upon flat cars for the present purposes.

It is obvious, furthermore, that the invention is susceptible of numerous changes, and while laterally shiftable, the platform need not necessarily be shiftable upon rollers, but may be lifted and displaced laterally, as proposed in the form of the invention shown in Figs. 9 to 12 inclusive, wherein the lower cross beams $24^a$ of the platform $16^a$ support intermediate and end cross bars $26^a$ adapted to rest in intermediate and end recesses $23^b$ of the transverse rigs $23^a$ across the bolster $15^a$, so that the platform may either rest with all of its cross bars $26^a$ in the several recesses $23^b$ or may be lifted and displaced laterally to the position shown in Fig. 11, with its intermediate cross bars in the recesses at one side of the main wheeled frame above the wheels $19^a$, thus forming a fulcrum upon which the platform $16^a$ may be swung to and from dumping position.

In this latter form of my invention, the transverse frame ribs $23^a$ are provided with pivoted levers $30^a$ forming inner upturned and laterally extending lugs $31^a$ adjacent the intermediate recesses $23^b$ of the transverse ribs $23^a$, the levers being acted upon by springs $32^a$ normally tending to hold the same in operative position, as shown in full lines in Fig. 9, with their lugs $31^a$ projecting above one of the cross bars $26^a$ and projecting into the adjacent recesses $23^b$ so as to thus lock the platform $16^a$ either in its normal position, shown in Fig. 9, or in its laterally shifted position as shown in Fig. 11, the platform being releasable in either position for laterally shifting or for tiltable movement and dumped by shifting the levers $30^a$ angularly to the dotted line position of Fig. 9, so as to withdraw the lugs $31^a$ from their locking positions above the respective cross bars $26^a$.

I claim:—

1. A dumping hand car comprising a wheeled frame including longitudinal bolsters, pairs of spaced parallel cross beams extending above and secured to the bolsters, rollers journaled in the spaces between the said beams, a platform having lower transverse ribs resting on the rollers and laterally shiftable thereon, hooks projecting outwardly from the bolsters and upturned, parallel cross beams carried by the lower surface of the platform, and provided with intermediate cross bars engageable with the said hooks to form fulcrums at opposite sides of the wheeled frame, upon which the platform is tiltable.

2. A dumping hand car comprising a wheeled frame including longitudinal bolsters, pairs of spaced parallel cross beams extending above and secured to the bolsters, rollers journaled in the spaces between the said beams, a platform having lower transverse ribs resting on the rollers and laterally shiftable thereon, hooks projecting outwardly from the bolsters and upturned, parallel cross beams carried by the lower surface of the platform and provided with intermediate cross bars engageable with the said hooks to form fulcrums at opposite sides of the wheeled frame, upon which the platform is tiltable, said cross beams of the platform depending upon opposite sides of the said hooks.

3. A dumping hand car comprising a wheeled frame including longitudinal bolsters, pairs of spaced parallel cross beams extending above and secured to the bolsters, rollers journaled in the spaces between the said beams, a platform having lower transverse ribs resting on the rollers and laterally shiftable thereon, hooks projecting outwardly from the bolsters and upturned, parallel cross beams carried by the lower surface of the platform, and provided with intermediate cross bars engageable with the said hooks to form fulcrums at opposite sides of the wheeled frame, upon which the platform is tiltable, said hooks projecting substantially in the vertical plane of the wheels of the said frame, and extending between the parallel beams of the platform.

4. A dumping hand car comprising a wheeled frame, a laterally shiftable platform carried by the frame and tiltable at opposite sides of the frame, and means for locking said platform in its normal and laterally shifted positions.

5. A dumping hand car comprising a wheeled frame, a laterally shiftable platform carried by the frame and tiltable at opposite sides of the frame, means for locking said platform in its normal and laterally shifted positions, and means for securing said locking means in inoperative position.

JAMES GUSTAVUS MEREDITH.

Copies of this patent may be obtained for five cents each, by addressing the "Commissioner of Patents, Washington, D. C."